P. B. BOSWORTH.
DEMOUNTABLE VEHICLE RIM.
APPLICATION FILED JULY 5, 1911.
1,063,500.
Patented June 3, 1913.
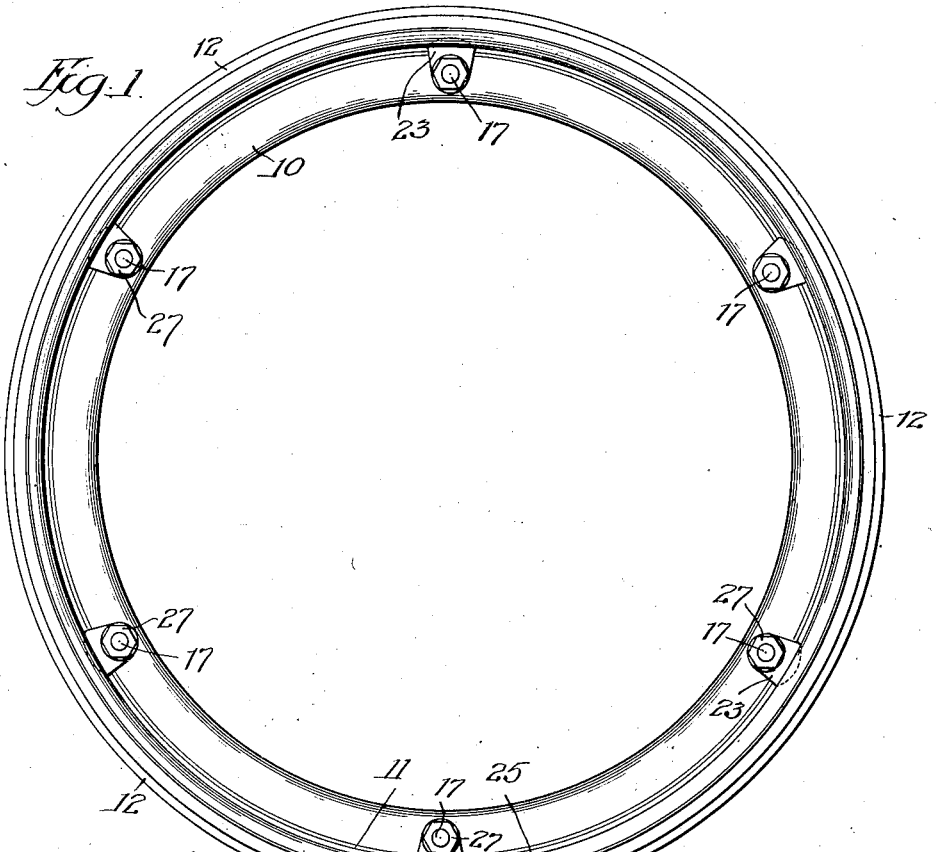
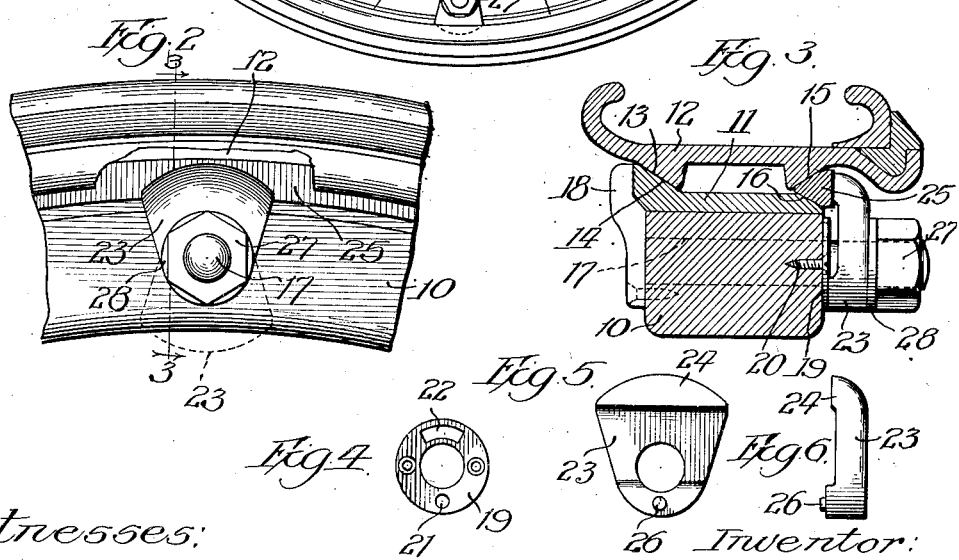
Witnesses:
Inventor:
Percy B. Bosworth,

UNITED STATES PATENT OFFICE.

PERCY B. BOSWORTH, OF AKRON, OHIO, ASSIGNOR TO THE FIRESTONE TIRE & RUBBER COMPANY, OF AKRON, OHIO, A CORPORATION OF OHIO.

DEMOUNTABLE VEHICLE-RIM.

1,063,500.          Specification of Letters Patent.      Patented June 3, 1913.

Application filed July 5, 1911. Serial No. 637,030.

*To all whom it may concern:*

Be it known that I, PERCY B. BOSWORTH, a citizen of the United States, residing at Akron, in the county of Summit and State of Ohio, have invented certain new and useful Improvements in Demountable Vehicle-Rims, of which the following is a specification.

My invention relates to a clamping mechanism for holding demountable vehicle rims in position, and refers particularly to means for retaining the clamps in the positions in which they may be placed.

The tire rim which is used in connection with my invention is ordinarily held in position on the felly rim by means of a V-shaped retaining ring, the latter being secured in place by means of suitable clamps. When it is desired to demount the tire rim, the clamps are first freed from engagement with the retaining ring, the latter is next removed, and the tire rim may then readily be slid laterally from the felly rim. It has been found that difficulty is often encountered, first, in holding the clamps in the correct position when they engage the retaining ring, and, second, in holding the clamps clear from the retaining ring when it is desired to remove the latter, as just described.

It is the object of my invention to provide means by which the clamps are always held in correct position with relation to the retaining ring after they are once adjusted, and means for positively preventing the clamps from turning and interfering with the retaining ring when it is desired to remove the same. In the preferred form of my invention I accomplish the desired result by providing each clamp with a pin which fits in a suitable socket or depression in a clamp lock fastened to the side of the felly. It will be evident that the engagement of the pin of the clamp with the socket in the clamp lock will effectually prevent the clamp from turning after it has been brought into contact with the retaining ring by means of the adjustment of a suitable nut or the like. On the other hand, a second depression substantially opposite to the socket above mentioned is provided in the clamp lock so that when the clamp is removed from engagement with the retaining ring the pin on the clamp will engage this second depression and prevent the clamp from rotating so that it would interfere with the removal of the retaining ring. These and other advantages of my invention will be more readily understood by reference to the accompanying drawings, which show a preferred embodiment of my improvements, and in which—

Figure 1 is a side elevation of the felly of a vehicle wheel having the tire rim and its associated parts secured thereto; Fig. 2 is an enlarged side elevation of a portion of the felly showing the tire rim and clamp in position; Fig. 3 is a transverse section on the line 3—3 of Fig. 2; Fig. 4 is an elevation of a clamp lock; Fig. 5 is a rear elevation of a clamp, and, Fig. 6 is a side elevation of the clamp shown in Fig. 5.

To the felly 10 is secured the felly rim 11 in the well known manner, this felly rim being engaged by the tire rim 12, having the obliquely disposed surface 13, which engages a corresponding surface 14 of the felly rim 11, and on the opposite side the oblique surface 15, which forms a V-shaped groove with the surface 16 of the felly rim. The bolts 17 pass transversely through the felly 10, each bolt having on one end the clamping member 18, which engages one side of the felly rim 11. On its opposite end the bolt 17 is threaded and passes through a suitable aperture in the clamp lock 19, which is fastened to the felly by screws 20. Each clamp lock 19 has a socket or aperture 21, and substantially opposite thereto a depression or second aperture 22, which is preferably somewhat elongated, as shown in Fig. 4. Placed in position on the bolt 17 and rotatable thereon is the clamp 23, the end 24 of which is adapted to engage the retaining ring 25. On its opposite end the clamp 23 has a pin or projection 26, which engages the socket or aperture 21 when the clamp 23 is in the position shown in full lines in Figs. 2 and 3, the nut 27 being screwed home against the washer 28, which engages the clamp 23. It will be apparent that on account of the engagement of the pin 26 with the socket 21 the clamp 23 is effectually prevented from rotating as long as the nut 27 holds it in its adjusted position.

When it is desired to remove the retaining ring 25 for the purpose of demounting the tire rim 12, the nut 27 is loosened, the clamp 23 is moved slightly to the right from the position indicated in Fig. 3, and may then be rotated on the bolt 17 into the position shown in dotted lines in Fig. 2. The pin 26 will then engage the depression or aperture 22, and may be secured therein by slightly tightening the nut 27. In this way the clamp 23 is held in its inoperative position, and there is no danger of having it interfere with the removal of the retaining ring 25. I prefer to make the depression or aperture 22 somewhat elongated, so that no careful adjustment is necessary in bringing the pin 26 into said depression.

By means of my improvement it will be apparent that the removal of the retaining ring 25 may be effected much more conveniently than has heretofore been the case, while at the same time after the clamps 23 are placed in their operative positions there is no danger of having them rotate and become disengaged from the retaining ring 25.

It will be clear to those skilled in the art that many changes could be made in the detailed construction of the parts which I have described without departing from the spirit or scope of my invention.

What I claim is:

1. A vehicle wheel having a demountable rim, and means for securing the same in place including a clamp locking plate secured to the wheel, and a clamp movable toward and from the side of the wheel rim, said clamp and its locking plate having interfitting projecting and recessed portions to prevent relative turning thereof.

2. A vehicle wheel having a demountable rim and means for securing the same in place including a clamp locking plate secured to the wheel, and a clamp operatively associated therewith, said clamp and its locking plate having separable alternately engaging interfitting projecting and recessed portions to prevent relative turning thereof first when clamping the rim in place and second when out of clamping position respecting the rim.

3. In a vehicle wheel, the combination of a demountable rim, a rotatable clamp for holding said rim in position, and a projection on the inner face of said clamp adapted to engage a suitable depression in said wheel, whereby said clamp is prevented from rotating when rotated away from clamping relation to the demountable rim, substantially as described.

4. In a vehicle wheel, the combination with a felly, of a demountable tire rim, a rotatable clamp for securing said rim in position on said felly, said clamp having a projection thereon adapted to engage any of a number of suitable depressions associated with said felly, whereby said clamp is maintained in any one of a plurality of adjusted positions, substantially as described.

5. In a vehicle wheel, the combination of a felly, a demountable tire rim, a retaining ring for holding said rim in position, a rotatable clamp adapted to engage said retaining ring, said clamp having a projection thereon, and a clamp lock between said clamp and said felly, said clamp lock having a depression adapted to be engaged by the projection on said clamp, whereby the latter is prevented from rotating when in an adjusted position, substantially as described.

6. In a vehicle wheel, the combination of a felly, a demountable tire rim, a retaining ring for holding said rim in position, a rotatable clamp adapted to engage said retaining ring, said clamp having a projection thereon, and a clamp lock between said clamp and said felly, said clamp lock having a plurality of depressions therein, whereby said clamp is prevented from rotating when in any one of a plurality of adjusted positions, substantially as described.

7. In a vehicle wheel, the combination of a felly, a demountable tire rim, a retaining ring for holding said tire rim in position, a clamp for engaging said retaining ring, said clamp having a projection thereon and a clamp lock between said clamp and said felly, said clamp lock having a pair of depressions adapted to be engaged by the projection on said clamp, one of said depressions adapted to prevent said clamp from disengagement with said retaining ring and the other of said depressions adapted to maintain said clamp out of the path of said retaining ring when the latter is removed, substantially as described.

PERCY B. BOSWORTH.

Witnesses:
E. M. Hahn,
V. M. Greer.